United States Patent Office 3,154,537
Patented Oct. 27, 1964

3,154,537
NEOMYCIN PURIFICATION
Leon J. Heuser, Princeton, and Wilbur L. Bryan, Belle Mead, N.J., assignors to Olin Mathieson Chemical Corporation, New York, N.Y., a corporation of Virginia
No Drawing. Filed Apr. 2, 1962, Ser. No. 184,521
13 Claims. (Cl. 260—210)

This application is a continuation-in-part of our application, Serial No. 113,601, filed May 31, 1961, now abandoned.

This invention relates to, and has for its object the provision of, an improved process for the purification of neomycin. [By "neomycin" is meant, inter alia, neomycin B, neomycin C, and mixtures thereof].

The presently employed process of recovering neomycin from aqueous culture media in which the antibiotic is produced, or from aqueous solutions in which the antibiotic or its salts are otherwise present in impure state, require numerous steps to obtain the antibiotic in sufficient purity to be safe for administration to humans. The commonly employed purification and recovery processes require the adsorption of the antibiotic on an ion exchange resin and a plurality of extractive or precipitative steps for removing the antibiotic from the adsorbent and for purifying it. One such process is disclosed in U.S. Patent No. 2,793,978.

Because of the ready solubility of salts of neomycin in water, and their very slight solubility in most organic solvents, it has been difficult to purify neomycin by solvent extraction processes, and to free them from impurities which inevitably are produced by the fermentation simultaneously with the desired antibiotic. It is an object of the present invention, therefore, to provide a simple, efficient process of obtaining neomycin or its salts in a purified state.

A further object of this invention is the provision of novel derivatives of neomycin useful in these purification methods and for other purposes, and methods of preparing them.

It has been found that selective purification of neomycin can be accomplished by a method which essentially comprises reacting neomycin (or salts thereof), in solution, with a higher aliphatic aldehyde so as to form an imine (Schiff's base) type derivative, which can be easily separated from the impure solution and from which neomycin (or salts thereof), of increased purity, can be regenerated. This discovery is surprising in view of the reported failure of lower alkanals, such as formaldehyde, acetaldehyde and butyraldehyde, to form Schiff's bases with neomycin.

The neomycin employed as a reactant in the process of this invention may be of any degree of purity and thus may represent the neomycin present in a whole broth of a neomycin-producing culture of Streptomyces. Preferably, however, the neomycin has been at least partially recovered from such broth. This recovery is most usually done by treating the broth with a cation exchange resin and eluting the neomycin adsorbed thereon by means of a dilute mineral acid. One such process is described in U.S. Patent No. 2,793,978. The neomycin is present in the aqueous eluate in the form of an acid-addition salt of the eluting acid and such solution may be used directly in the process of this invention.

By "a higher aliphatic aldehyde" is meant an aliphatic aldehyde of more than four carbon atoms. Such aliphatic aldehydes include alkanals of more than four carbon atoms, as exemplified by isopentaldehyde, heptaldehyde, octylaldehyde, 2-ethylhexaldehyde, nonylaldehyde, decylaldehyde and dodecylaldehyde; substituted alkanals of more than four carbon atoms, such as halo, nitro and alkoxy substituted alkanals of more than four carbon atoms; aryl substituted alkanals, as exemplified by phenyl (lower alkanals), such as phenylacetaldehyde, hydrocinnamaldehyde, and 2-phenylpropionaldehyde, and halo, nitro and alkoxy substituted derivatives thereof; aryl substituted alkenals, as exemplified by phenyl (lower alkenals), such as cinnamaldehyde; and heterocyclic substituted alkanals, as exemplified by 2-furaldehyde, 2-thiophenaldehyde and pyridine-4-aldehyde.

To assure complete reaction, the aldehyde is present in molar excess, preferably at least 4 moles of aldehyde per mole of neomycin being used and optimally at least 6 moles. To form the Schiff's base the reaction is conducted under alkaline conditions, preferably at a pH in the range of about 7 to about 12 (optimally about 9 to about 10.5). If the neomycin is initially at an acid or neutral pH, as would be an aqueous solution of an acid-addition salt of neomycin with a strong acid (e.g. neomycin sulfate and neomycin hydrochloride), the solution is rendered alkaline by the addition of a base, such as an alkali (e.g., sodium hydroxide and potassium hydroxide) or a suitable amine, such as triethylamine.

If an aqueous medium is used, the resulting Schiff's base, which, unlike the acid-addition salts of neomycin, is relatively insoluble in water, may be recovered either as a precipitate by filtration or centrifugation or may be extracted into an organic solvent therefor, such as a water-immiscible organic solvent, as exemplified by n-butanol, pentasol, isobutylacetate, amyl acetate and methyl isobutyl ketone.

To recover the neomycin, the Schiff's base (if not already in solution) is dissolved in an organic solvent, such as one of the water-immiscible organic solvents mentioned hereinbefore, and treated with water and a strong acid, such as a mineral acid (e.g., hydrochloric acid, sulfuric acid, and phosphoric acid), whereby the Schiff's base is hydrolyzed and the neomycin is converted to its salt with the acid. From the aqueous phase, the acid-addition salt of neomycin can be recovered in the usual way by either evaporating off the water, or, preferably, by addition of a water-miscible organic solvent, such as acetone, methanol, ethanol, propanol and isopropanol, to precipitate the neomycin salt.

Although the above procedure represents the preferred method by which the process of this invention is used to purify neomycin, other alternative methods may also be used. Thus, neomycin base may be mixed directly with the higher aliphatic aldehyde, especially the lower members of the group which are liquids and water added to precipitate the resulting Schiff's base. To the Schiff's base may then be added an aqueous acid to hydrolyze the base and yield an aqueous solution of the neomycin acid-addition salt. The aqueous solution can then be separated if the aldehyde is insoluble in water, and the neomycin acid-addition salt recovered therefrom by lyophilization or precipitation by treatment with an organic solvent.

Other alternative procedures will suggest themselves to one skilled in the art. All such procedures are within the purview of this invention provided that they entail the steps of converting neomycin into a Schiff's base with a higher aliphatic aldehyde, separation of the Schiff's base and hydrolysis thereof to yield either neomycin or an acid-addition salt thereof.

The following examples illustrative the process of this invention:

*Example 1*

10 g. of neomycin sulfate, containing 500 units of neomycin per mg., is dissolved in 100 ml. of water and the pH is adjusted to 10.2 with 40% aqueous sodium hydroxide. 10 g. of 2-ethylhexaldehyde is added and the mixture is stirred vigorously for 90 minutes while maintaining the pH at 10.0–10.5 by addition of 40% aqueous NaOH. 50 ml. of n-butanol is then added and after 20 minutes agitation the mixture is separated. The butanol phase, containing 2-ethylhexylidene neomycin, is then extracted with 25 ml. of water at pH 2.5 by acidifying the mixture with 40% aqueous sulfuric acid. The rich aqueous extract is separated, neutralized with triethylamine to pH 5.6 and treated with 1 g. of Darco G-60. 125 ml. of methanol is added to yield a precipitate of 7.5 g. of neomycin sulfate, containing 630 units of neomycin per mg. The yield is 95%.

*Example 2*

Two liters of a whole fermentation broth containing 4110 gamma per ml. of neomycin activity, is adjusted to pH 10.0 with 20% NaOH and mixed with 20 ml. of 2-ethylhexaldehyde in 1 liter of n-butanol. After 90 minutes agitation while maintaining a pH of 10.0, the mixture is centrifuged. 770 ml. of the recovered solvent layer is then extracted with 530 ml. of water at pH 2.5 using 20% sulfuric acid for acidification. The aqueous layer after separation is adjusted to pH 6.5 with triethylamine and concentrated to 100 ml. under vacuum. The concentrate is treated with 2 g. of Darco G-60 and the neomycin sulfate is precipitated with methanol, to yield about 8.1 g. of neomycin sulfate with an activity of 679 gamma per mg.

*Example 3*

10 g. of neomycin sulfate (550 gamma/mcg.) is dissolved in 100 ml. of water. Triethylamine is added to pH 9.5 followed by 10 ml. of isopentaldehyde. The pH which falls to 7.4 is readjusted to 9.5 with triethylamine. After 90 minutes agitation, the mixture is allowed to stand at 5° C. for two hours. The solids are filtered and washed with 10 ml. of water to yield about 11.5 g. of the Schiff's base. The Schiff's base is slurried in 50 ml. of methyl isobutyl ketone and filtered. To the filtrate is added 75 ml. of water and the mixture acidified to pH 2.6 with 40% sulfuric acid. The aqueous layer after separation is neutralized with Amberlite IRA-400 to pH 5.5. The resin is removed by filtration and the filtrate treated with 2.5 g. of Darco G-60. The filtered solution is then lyophilized to give about 6 g. of neomycin sulfate with an activity of 650 $\mu$/mg.

Alternatively, the Schiff's base may be dissolved in 90% aqueous ethanol in a proportion of 2 g./18 ml. of solvent and the neomycin sulfate precipitated by the addition of 40% sulfuric acid. On reaching a pH of 5.9, the mixture is agitated ½ hour and filtered. The yield is about 1.65 g. of neomycin sulfate with an activity of 560 $\mu$/mg.

*Example 4*

Following the procedure of Example 1 but substituting an equivalent amount of heptaldehyde for the 2-ethylhexaldehyde, heptylidene neomycin is obtained and converted to neomycin sulfate.

*Example 5*

Following the procedure of Example 1 but substituting an equivalent amount of phenylacetaldehyde for the 2-ethylhexaldehyde, phenylethylidene neomycin is obtained and converted to neomycin sulfate.

Similarly, octylaldehyde, nonylaldehyde, decylaldehyde, dodecylaldehyde, hydrocinnamaldehyde, 2-phenylpropionaldehyde, cinnamaldehyde, 2-furaldehyde, 2-thiopheneladehyde and pyridine-4-aldehyde yield their respective Schiff's base derivatives of neomycin when the respective aldehydes are substituted in the procedure of Example 1 or 3. Each of these Schiff's bases can be converted to neomycin sulfate by the procedure of said examples.

The invention may be variously otherwise embodied within the scope of the appended claims.

What is claimed is:

1. The method of purifying neomycin, which comprises reacting a compound selected from the group consisting of neomycin and an acid-addition salt thereof with a higher aliphatic aldehyde selected from the group consisting of alkanals of five to thirteen carbon atoms; phenyl(lower alkanals); halo, nitro and alkoxy substituted derivatives of both of these; phenyl(lower alkenals); 2-furaldehyde; 2-thiophenaldehyde and pyridine-4-aldehyde, separating the resulting neomycin Schiff's base, and converting said Schiff's base to substantially purer neomycin.

2. The method of purifying neomycin, which comprises reacting an aqueous alkaline solution of a compound selected from the group consisting of neomycin and an acid-addition salt thereof with a higher aliphatic aldehyde selected from the group consisting of alkanals of five to thirteen carbon atoms; phenyl(lower alkanals); halo, nitro and alkoxy substituted derivatives of both of these; phenyl(lower alkenals); 2-furaldehyde; 2-thiophenaldehyde and pyridine-4-aldehyde whereby a Schiff's base of neomycin with said aldehyde is formed, separating said Schiff's base, and converting said Schiff's base to substantially purer neomycin.

3. The method of claim 2 wherein the acid-addition salt of neomycin is neomycin sulfate.

4. The method of claim 2 wherein the aldehyde is alkanal of five to thirteen carbon atoms.

5. The method of claim 2 wherein the aldehyde is 2-ethylhexaldehyde.

6. The method of claim 2 wherein the Schiff's base is converted to purer neomycin by treatment with an aqueous mineral acid, whereby the Schiff's base is hydrolyzed and the neomycin is converted to its acid-addition salt with said acid.

7. The method of purifying neomycin, which comprises reacting an aqueous alkaline solution of a compound selected from the group consisting of neomycin and an acid-addition salt thereof with a higher aliphatic aldehyde selected from the group consisting of alkanals of five to thirteen carbon atoms; phenyl(lower alkanals); halo, nitro and alkoxy substituted derivatives of both of these; phenyl(lower alkenals); 2-furaldehyde; 2-thiophenaldehyde and pyridine-4-aldehyde whereby a Schiff's base of neomycin with said aldehyde precipitates, separating the precipitate, dissolving the precipitate in a water-immiscible organic solvent, adding an aqueous mineral acid, separating the aqueous phase, and recovering purified neomycin from said aqueous phase.

8. The method of purifying neomycin, which comprises reacting an aqueous alkaline solution of a compound selected from the group consisting of neomycin and an acid-addition salt thereof with a higher aliphatic aldehyde in the presence of a water-immiscible organic solvent, whereby a solution of a Schiff's base of neomycin with said aldehyde in said water-immiscible organic solvent is formed, separating the water-immiscible organic solvent phase, treating said separated phase with an aqueous mineral acid, separating the aqueous phase, and recovering purified neomycin from said aqueous phase.

9. The Schiff's base of neomycin and a higher aliphatic aldehyde selected from the group consisting of alkanals of five to thirteen carbon atoms; phenyl(lower alkanals); halo, nitro and alkoxy substituted derivatives of both of these; phenyl(lower alkenals); 2-furaldehyde; 2-thiophenaldehyde and pyridine-4-aldehyde.

10. The Schiff's base of neomycin and an alkanal of of five to thirteen carbon atoms.

11. 2-ethylhexylidene neomycin.

12. The Schiff's base of neomycin and a phenyl(lower alkanal).

13. The Schiff's base of neomycin and a phenyl(lower alkenal).

References Cited in the file of this patent

UNITED STATES PATENTS 2,951,790      Stainbrook _____ Sept. 6, 1960

FOREIGN PATENTS 839,023      Great Britain _____ June 29, 1960